United States Patent
Gillette et al.

(10) Patent No.: US 12,105,302 B2
(45) Date of Patent: Oct. 1, 2024

(54) OPTICAL STACKS FOR DETECTION SYSTEMS

(71) Applicant: 3M INNOVATIVE PROPERTIES COMPANY, St. Paul, MN (US)

(72) Inventors: Kristy A. Gillette, Spring Valley, WI (US); Zhaohui Yang, North Oaks, MN (US); Joseph P. Attard, Woodbury, MN (US); Martin E. Denker, Vadnais Heights, MN (US)

(73) Assignee: 3M INNOVATIVE PROPERTIES COMPANY, St. Paul, MN (US)

( * ) Notice: Subject to any disclaimer, the term of this patent is extended or adjusted under 35 U.S.C. 154(b) by 0 days.

(21) Appl. No.: 18/568,323

(22) PCT Filed: Jun. 28, 2022

(86) PCT No.: PCT/IB2022/056001
§ 371 (c)(1),
(2) Date: Dec. 8, 2023

(87) PCT Pub. No.: WO2023/275748
PCT Pub. Date: Jan. 5, 2023

(65) Prior Publication Data
US 2024/0272334 A1 Aug. 15, 2024

Related U.S. Application Data
(60) Provisional application No. 63/202,911, filed on Jun. 30, 2021.

(51) Int. Cl.
G02B 5/08 (2006.01)
G02B 3/00 (2006.01)
(Continued)

(52) U.S. Cl.
CPC ............ *G02B 3/0037* (2013.01); *G02B 5/02* (2013.01); *G06V 40/1318* (2022.01)

(58) Field of Classification Search
CPC . G02B 5/00; G02B 5/003; G02B 5/02; G02B 5/021; G02B 5/0221; G02B 5/0226;
(Continued)

(56) References Cited

U.S. PATENT DOCUMENTS 11,670,109 B2 * 6/2023 Hsueh .................. H10K 59/65
345/173
2002/0044360 A1 4/2002 Yoshida et al.
(Continued)

FOREIGN PATENT DOCUMENTS

KR 20210037680 A 4/2021
WO 2020035768 A1 2/2020

OTHER PUBLICATIONS

International Search report for PCT International Application No. PCT/IB2022/056001, mailed on Sep. 23, 2022, 3 pages.

*Primary Examiner* — Thong Q Nguyen
(74) *Attorney, Agent, or Firm* — Clifton F. Richardson

(57) ABSTRACT

An integral optical stack includes a lens film having first and second major surfaces. The first major surface includes microlenses having an average peak-to-valley height PV1. A light absorbing layer is disposed on the lens film and defines a plurality of openings. A substantially planarizing optically diffusive layer is disposed on the first major surface of the lens film, conforming to the microlenses. The optically diffusive layer includes a plurality of nanoparticles. A polymeric material bonds the nanoparticles to each other to form a plurality of nanoparticle aggregates defining a plurality of voids therebetween. The optically diffusive layer has an average thickness greater than about 8 microns, and an index of refraction of less than about 1.25. Any non-planarity of a major surface of the optically diffusive layer due to the
(Continued)

microlenses of the first major surface has an average peak-to-valley height PV2, PV2≤0.7 PV1.

8 Claims, 4 Drawing Sheets

(51) Int. Cl.
*G02B 5/02* (2006.01)
*G06V 40/13* (2022.01)

(58) Field of Classification Search
CPC .. G02B 5/0231; G02B 5/0236; G02B 5/0242; G02B 5/0247; G02B 3/00; G02B 3/0006; G02B 3/0037; G02B 3/0043; G02B 3/005; G02B 3/0056; G02B 3/0062; G02B 3/0068; G02B 3/0087; G02B 3/0093; G02B 3/02; G02B 1/041; G02B 1/045; G02B 1/10; G02B 1/11; G02B 1/111; G02B 1/113; G02B 1/14; G02B 1/16; G02B 1/18; G06V 40/1318
USPC .......................................... 359/599, 601–614
See application file for complete search history.

(56) References Cited

U.S. PATENT DOCUMENTS

| | | |
|---|---|---|
| 2007/0159699 A1 | 7/2007 | Wang et al. |
| 2007/0258149 A1 | 11/2007 | Gardner et al. |
| 2012/0038990 A1 | 2/2012 | Hao et al. |
| 2016/0097895 A1 | 4/2016 | Wolk et al. |

* cited by examiner

OPTICAL STACKS FOR DETECTION SYSTEMS

CROSS REFERENCE TO RELATED APPLICATIONS

This application is a national stage filing under 35 U.S.C. 371 of PCT/IB2022/056001, filed Jun. 28, 2022, which claims the benefit of U.S. Application No. 63/202,911, filed Jun. 30, 2021, the disclosures of which are incorporated by reference in their entireties herein.

TECHNICAL FIELD

The present disclosure generally relates to optical stacks, particularly to optical stacks for detection systems such as fingerprint detection systems.

BACKGROUND

Optical systems, such as display systems, fingerprint sensing systems and biometric systems, utilize one or more optical layers for managing incident light. Often, the optical layers are required to have a desired optical transmittance, optical haze, optical clarity, and index of refraction. In many applications, an air layer and a diffuser layer are incorporated into the optical system. Typically, the air layer supports total internal reflection and the diffuser layer provides optical diffusion. A number of leading smartphone brands are exploring full-screen fingerprint sensing to simplify device access and enhance security. The enabling technologies include optical sensors embedded in displays in combination with requisite light control to obtain a fingerprint image of sufficient resolution.

SUMMARY

Some aspects of the disclosure relate to an integral optical stack including a lens film including an outermost structured first major surface and an opposing outermost second major surface. The structured first major surface includes a two-dimensional array of microlenses having an average peak-to-valley height PV1. A light absorbing layer is disposed on the second major surface side of the lens film and defines a plurality of through physical openings therein extending between opposite outermost major surfaces of the light absorbing layer. The through physical openings are aligned to the microlenses in a one-to-one correspondence. A substantially planarizing optically diffusive layer is disposed on the structured first major surface of the lens film. An outermost substantially planar third major surface of the substantially planarizing optically diffusive layer faces away from the first major surface of the lens film. An opposite outermost structured fourth major surface of the substantially planarizing optically diffusive layer faces and substantially conforms to the microlenses in the array of microlenses of the structured first major surface. The optically diffusive film layer includes a plurality of nanoparticles dispersed between and across the third and fourth major surfaces, the nanoparticles including silica. A polymeric material bonds the nanoparticles to each other to form a plurality of nanoparticle aggregates defining a plurality of voids therebetween. In a cross-section of the optically diffusive layer in a plane substantially orthogonal to the optically diffusive layer, the nanoparticles have an average size of between about 20 nm to about 150 nm, the nanoparticle aggregates have an average size of between about 100 nm and about 1000 nm, and the voids occupy between about 15% to about 45% of an area of the optically diffusive layer. The optically diffusive layer has an average thickness of greater than about 8 microns and an index of refraction of less than about 1.25 for at least one visible wavelength in a range from about 420 nm to about 680 nm. Any non-planarity of the substantially planar third major surface due to the microlenses in the array of microlenses of the structured first major surface has an average peak-to-valley height PV2, PV2≤0.7 PV1, wherein the optical stack has an integral construction.

Other aspects of the disclosure relate to a detection system for detecting a user body portion applied to the detection system. The detection system includes a light source, and the integral optical stack of one or more embodiments of the disclosure disposed on an optical detector. The light source is configured to emit a first light toward the user body portion applied to the detection system. The optical detector is configured to detect at least a portion of the first light after it is reflected by the user body portion and passes through at least some of the through physical openings.

These and other aspects of the present application will be apparent from the detailed description below. In no event, however, should the above summaries be construed as limitations on the claimed subject matter, which subject matter is defined solely by the attached claims.

BRIEF DESCRIPTION OF DRAWINGS

The various aspects of the disclosure will be discussed in greater detail with reference to the accompanying figures where, FIG. 1 schematically shows a detection system having a stacked optical construction in accordance with some embodiments.

The figures are not necessarily to scale. Like numbers used in the figures refer to like components. However, it will be understood that the use of a number to refer to a component in a given figure is not intended to limit the component in another figure labeled with the same number.

DETAILED DESCRIPTION OF ILLUSTRATIVE EMBODIMENTS

In the following detailed description, reference is made to the accompanying drawings that form a part hereof, and in which are shown by way of illustration several specific embodiments. It is to be understood that other embodiments are contemplated and may be made without departing from the scope or spirit of the present disclosure.

Collimation films and IR/visible light blocking layers have been developed, for instance, in organic light emitting diode (OLED) fingerprint sensing (FPS) applications. The optical construction typically includes an air gap between an optical stack and the OLED panel and are affixed using adhesives. Embodiments described herein are applicable to full active area sensing detection systems with a fully bondable sensing solution.

Some embodiments describe an optical stack to enable a fully bondable sensing solution. A combination of ultra-low index (ULI) layer and microlens design can be tuned to provide flat optics for an integrated direct to panel stack. To obtain flat optics, the planarity of the ULI layer deposited on the microlens structure is critical and the optical power of the system cannot be compromised.

Figure 1:
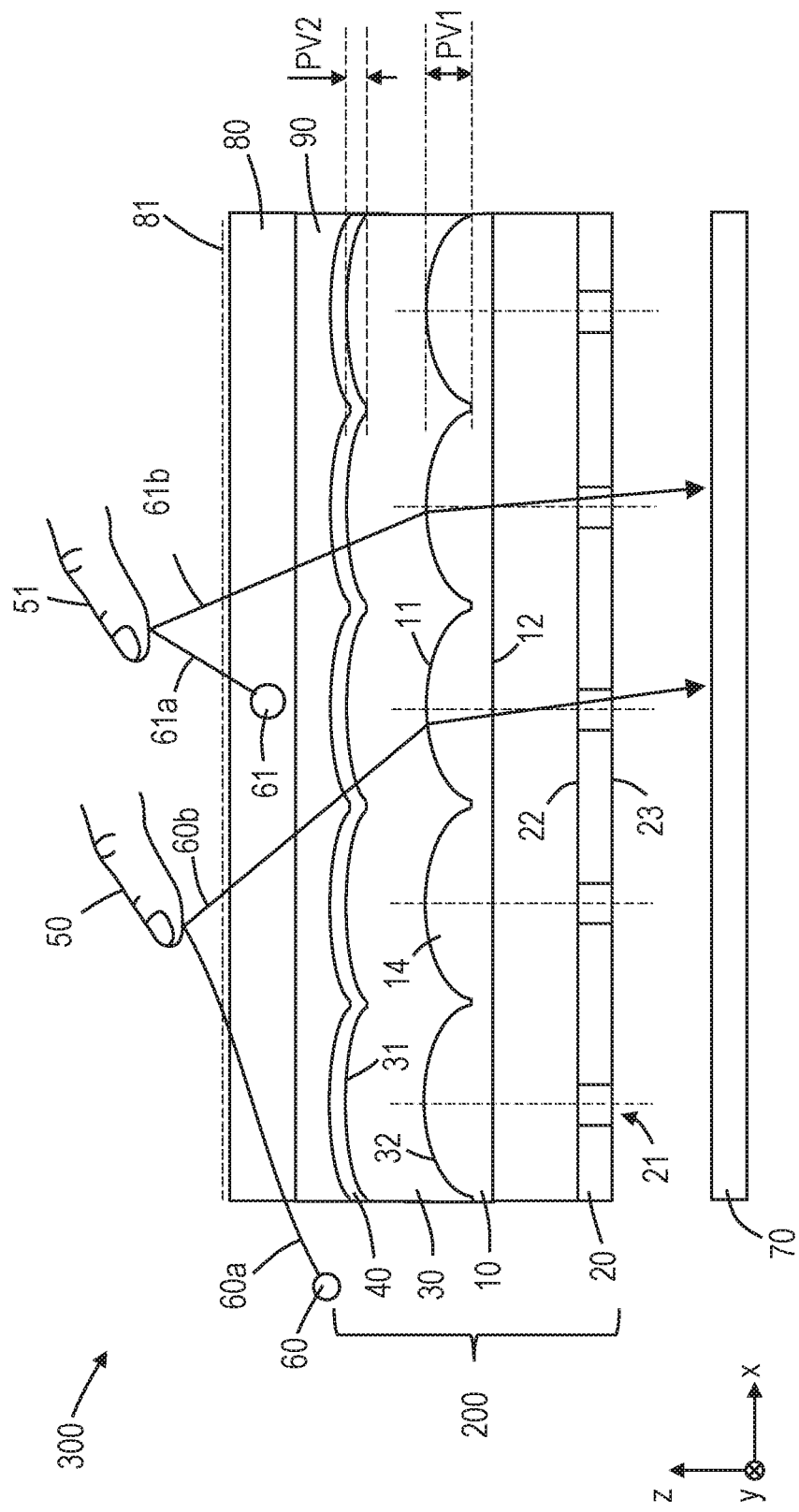

FIG. 1 illustrates a detection system (300) for detecting a user body portion (50, 51) applied to the detection system (300). In some cases the detection system (300) may be a fingerprint detection system and the user body portion (50, 51) may be a finger of a user of the detection system. The detection system may include a light source (60, 61) configured to emit a first light (60a, 61a) toward the user body portion (50, 51) applied to the detection system (300). The light source (60, 61) may be any type of device capable of emitting radiation in a desired wavelength range, for example a diode laser, an LED (light emitting diode), an OLED (organic light emitting diode), or the like. The detection system (300) further includes a display system including a display panel (80) configured to display an image (81) for viewing by the user.

In some cases, the light source (60) may be disposed on a lateral side of the optical stack (300). In some other cases, the light source (61) may be disposed inside the display panel (80). An optical detector (70) may be configured to detect at least a portion of the first light (60a, 61a) after being reflected (60b, 61b) by the user body portion (50, 51).

The detection system includes an optical stack (200) disposed on the optical detector (70). In some embodiments, the optical stack (200) may have an integral construction. The optical stack (200) may include a lens film (10), a light absorbing layer (20) and an optically diffusive layer (30) disposed on the lens film (10). The optical detector (70) may be an optical sensor disposed on the light absorbing side (20) of the optical stack (200).

Figure 2:
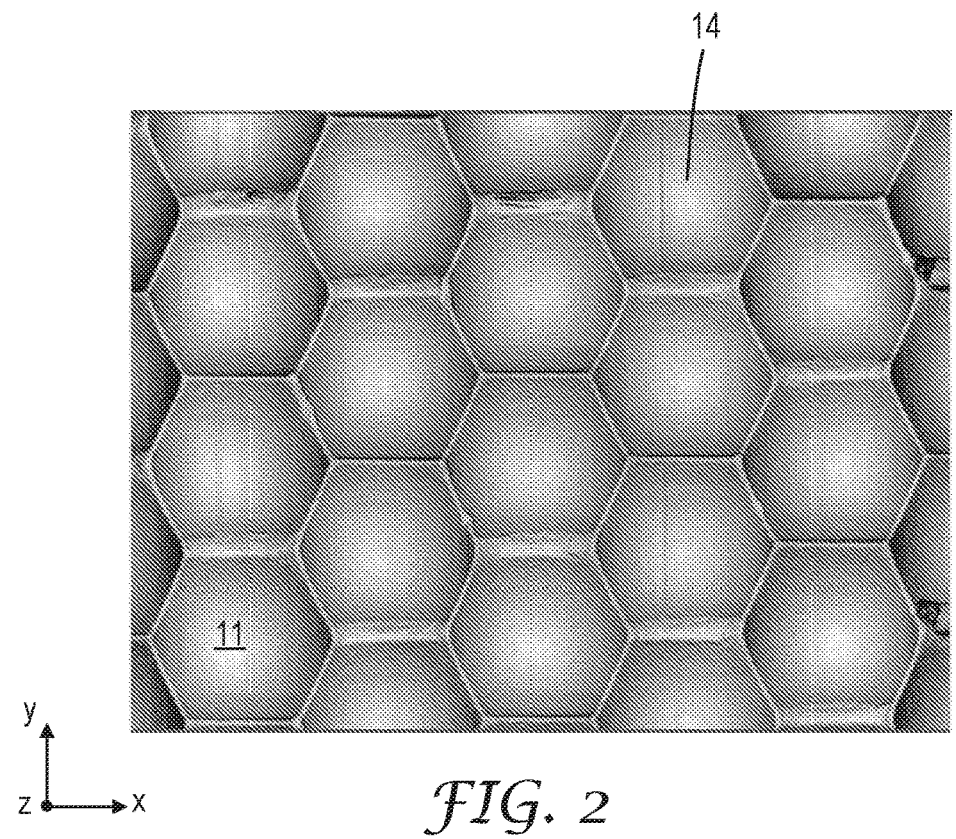
FIG. 2 shows the top down view SEM image of the microlenslet structures on PET substrate according to some aspects.

The lens film (10) includes an outermost structured first major surface (11) and an outermost second major surface (12) disposed opposite the structured first major surface (11). The structured first major surface (11) may include a plurality of microlenses (14). The plurality of microlenses (14) may be arranged as a two-dimensional array of microlenses along orthogonal first (x-axis) and second (y-axis) directions as shown in FIG. 2.

A microlens is a lens having at least one lateral dimension (e.g., diameter) less than 1 mm. In some embodiments, the average diameter of the microlenses (14) may be in a range of 5 micrometers to 1000 micrometers. In some instances, the array of microlenses, can have one or more of different sizes, shapes, indices of refraction, and focal lengths. For instance, the array can be regular (e.g., square or hexagonal lattice) or irregular (e.g., random or pseudorandom). In some instances, the microlenses (14) may have substantially equal focal lengths. The microlenses used in any of the embodiments described herein can be any suitable type of microlenses. In some embodiments, an array of microlenses may include at least one of refractive lenses, diffractive lenses, metalenses (e.g., surface using nanostructures to focus light), Fresnel lenses, symmetric lenses (e.g., rotationally symmetric about an optical axis), asymmetric lenses (e.g., not rotationally symmetric about an optical axis), or combinations thereof. In some instances, at least some of the microlenses may be spherical microlenses. In other instances, at least some of the microlenses may be aspherical microlenses.

The microlenses (14), in some embodiments, may be curved about the orthogonal first (x-axis) and second (y-axis) directions and may have an average peak-to-valley height, PV1. In some aspects, PV1 may be greater than about 1.5 microns. In some instances, PV1 may be greater than about 2 microns, or greater than about 3 microns, or greater than about 4 microns, or greater than about 5 microns, or greater than about 6 microns.

The light absorbing layer (20) may be disposed on the second major surface (12) of the lens film (10). The average thickness of the light absorbing layer (20) may be greater than about 0.5 microns. In some instances, the average thickness of the light absorbing layer (20) may be about 0.75 microns, or about 1.0 microns, or about 1.25 microns. In some other instances, the average thickness of the light absorbing layer (20) may be greater than about 1.5 microns, or about 1.75 microns, or about 2 microns, or about 2.5 microns, or greater than about 3 microns. The optical density of the light absorbing layer (20) may be greater than about 3 for at least one visible wavelength in a visible wavelength range extending from about 420 nm to about 680 nm. In some aspects, the at least one visible wavelength may include a blue, a green or a red wavelength. In some instances, the optical density of the light absorbing layer (20) may be about 3.5, or 4, or 4.5, or 5, or 5.5, or 6, or 7.

In some aspects, the light absorbing layer (20) may define a plurality of through physical openings (21), or pinholes, therein extending between opposite outermost major surfaces (22, 23) of the light absorbing layer (20). In some instances, the opposite major surfaces (22, 23) may be opposite top and bottom surfaces of the light absorbing layer (20) and the through physical openings (21) may be aligned to the microlenses (14) in a one-to-one correspondence. A portion of the light (60b, 61b) reflected by the user body portion (50, 51) may be configured to pass through at least some of the through physical openings (21).

The through physical openings (21) formed in one or more embodiments described herein can have any suitable shape. In some embodiments, the through physical openings (21) may include at least one of elliptical pinholes, circular pinholes, rectangular pinholes, square pinholes, triangular pinholes, and irregular pinholes. In some cases, the through physical openings (21) may include any combinations of these pinhole shapes.

The through physical openings (21) in the light absorbing layer (20) may be formed by laser ablation through the microlenses (14), for example. Suitable lasers may include fiber lasers such as a 40W pulsed fiber laser operating a wavelength of 1070 nm, for example. Creating openings in a layer using a laser through a microlens array is generally described in US2007/0258149 (Gardner et al.), for example. An absorption overcoat can optionally be applied to the optical stack (200) to increase the absorption of energy from the laser. In some embodiments, the light absorbing layer (20) may include a UV-cured polymer material and the plurality of laser ablated through physical openings (21) may be formed therein. It may be desirable that the UV-cured polymer material has sufficiently high absorption of the laser to be ablated to form the openings. After ablation, it may be desirable that the light absorbing layer (20) including the UV-cured polymer material blocks visible light to a sufficiently high degree to meet the light blocking metrics (FWHM, cross talk etc.).

The optically diffusive layer (30) may be a substantially planarizing optically diffusive layer. The optically diffusive layer (30) may be disposed on the structured first major surface (11) of the lens film (10). The optically diffusive layer (30) includes an outermost third major surface (31) facing away from the first major surface (11) of the lens film (10) and an outermost structured fourth major surface (32) opposite the third major surface (31). In some embodiments, the fourth major surface (32) of the optically diffusive layer (30) may face and substantially conform to the microlenses (14) in the array of microlenses of the structured first major surface (11). The display panel (80) of the detection system (300) may be disposed on the third major surface (31) of the optically diffusive layer (30) opposite the light absorbing layer (20). A bonding layer (90) may be disposed between the display panel (80) and the third major surface (31) to bond the display panel to the optically diffusive layer (30). In some aspects, the bonding layer (90) may be devoid of air bubbles and configured to substantially scatter visible light.

The third major surface (31) of the optically diffusive layer (30) may be substantially planar. In some aspects, any non-planarity of the substantially planar third major surface (31) due to the microlenses (14) in the array of microlenses of the structured first major surface (11) may have an average peak-to-valley height PV2. For optimal optical power, the non-planarity, PV2, may be less than 1 micron. In some other cases, PV2 may be less than about 0.9 microns, or less than about 0.8 microns, or less than about 0.7 microns, or less than about 0.6 microns, or less than about 0.5 microns. In other cases, PV2≤0.7 PV1, or PV2≤0.6 PV1, or PV2≤0.5 PV1, or PV2≤0.5 PV1, or PV2≤0.4 PV1, or PV2≤0.3 PV1.

The thickness of the optically diffusive layer (30) disposed on the army of microlenses (14) may be chosen to sufficiently planarize the microlenses (14). In some aspects, the optically diffusive layer (30) may have an average thickness of greater than about 8 microns. In some cases, the average thickness of the optically diffusive layer (30) may be greater than about 9 microns, or greater than about 10 microns, or greater than about 11 microns, or greater than about 12 microns, or greater than about 13 microns, or greater than about 14 microns, or greater than about 15 microns, or greater than about 20 microns. In some aspects, the optically diffusive layer (30) may be a low index or an ultra low index (ULI) layer, for example, a nanovoided ULI layer as described in U.S. Pat. App. Pub. No. 2012/0038990 (Hao et al.). Such ULI layers may have a refractive index less than about 1.35 or less than about 1.3, or less than about 1.25, or less than about 1.22, or less than about 1.21, or less than about 1.2, or less than about 1.18, or less than about 1.15 for at least one visible wavelength in a range from about 420 nm to about 680 nm. The nanovoided ULI layer may have a low refractive index such that the nanovoided layer behaves optically like a layer of air but mechanically like any other solid layer that can be used to attach to other optical layers. In some aspects, the ULI coated optically diffusive layer (30) may conform to the structure of the array of microlenses (14) of which the ULI is deposited atop, even at thicknesses which exceed the magnitude of the peak to valley, PV1, within the structure. In other aspects, the combined array of microlenses (14) and ULI coated optically diffusive layers (14) can be tuned for optimal performance in that each lens shape will have a customized ULI layer.

Figure 3:
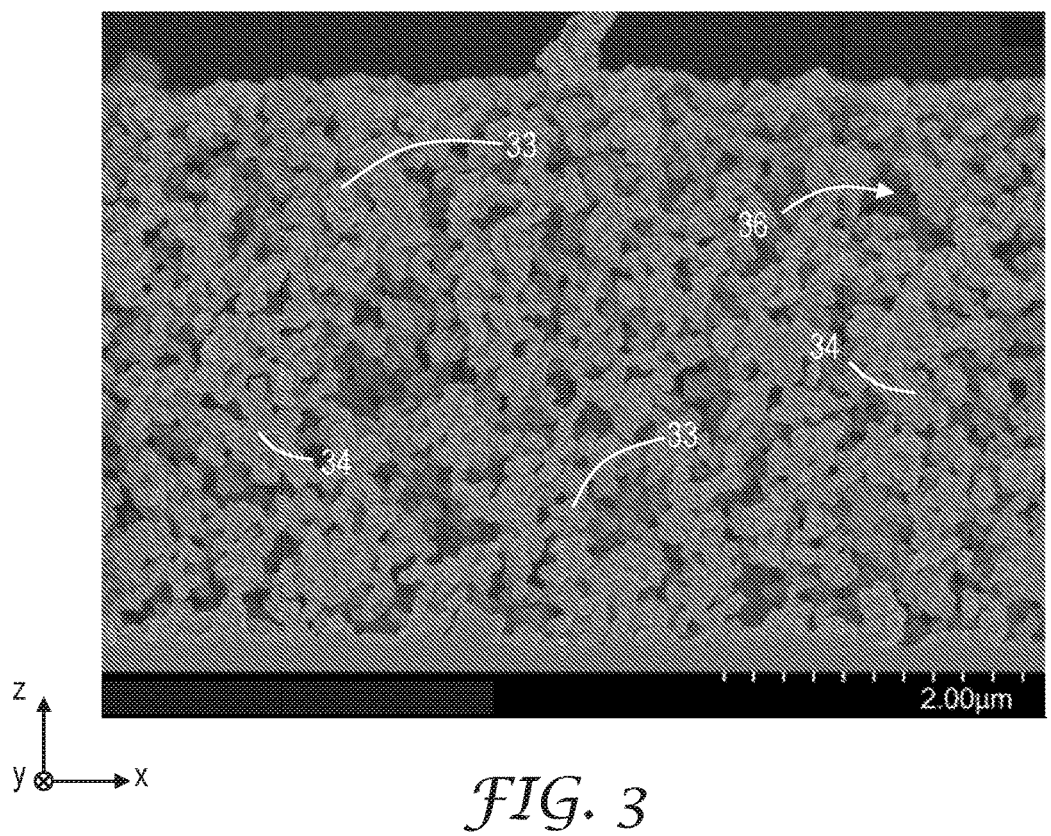
FIGS. 3-4 are exemplary SEMs of the top surface of the optical construction at different magnifications.
Figure 4:
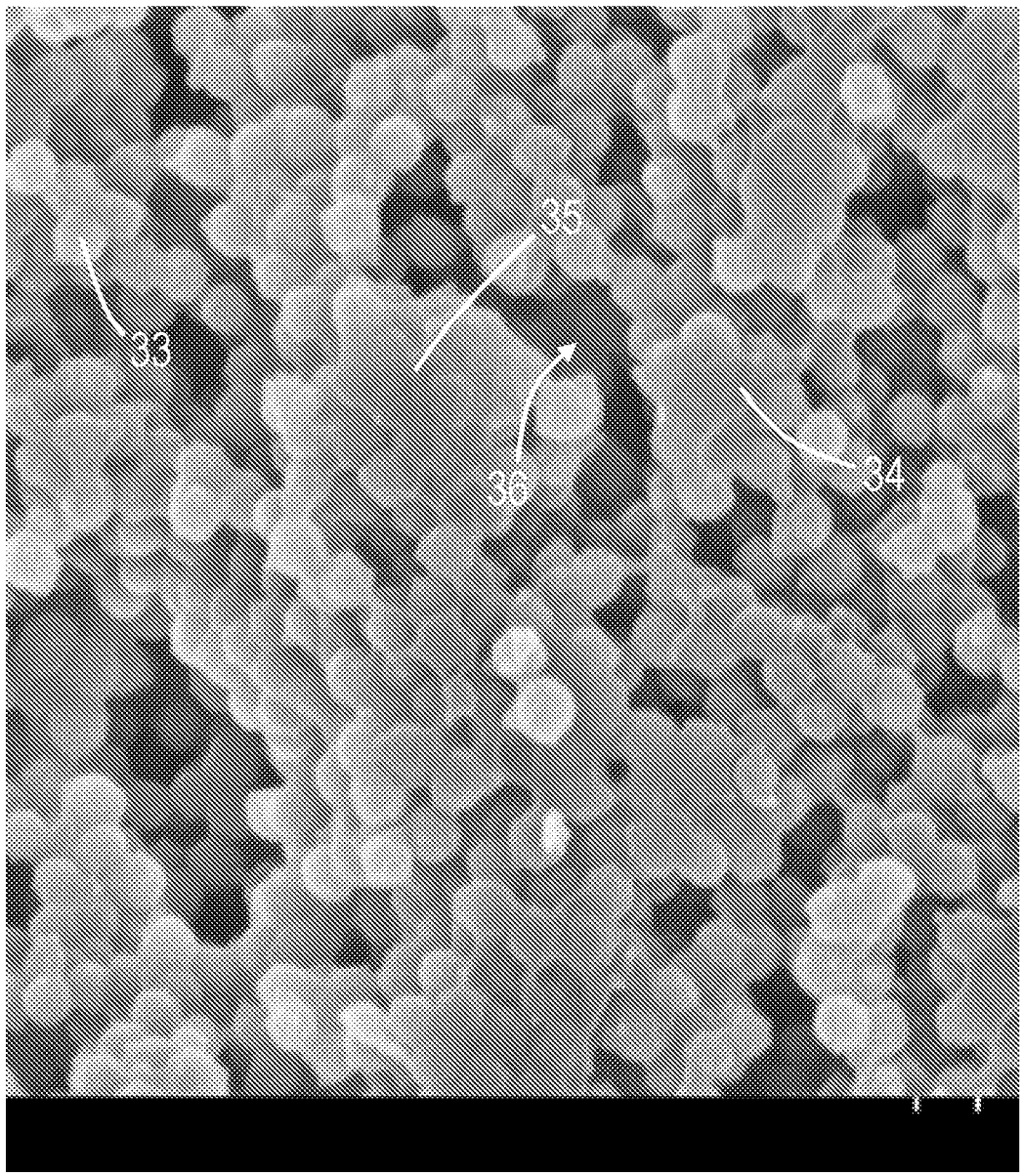
Figure 5:
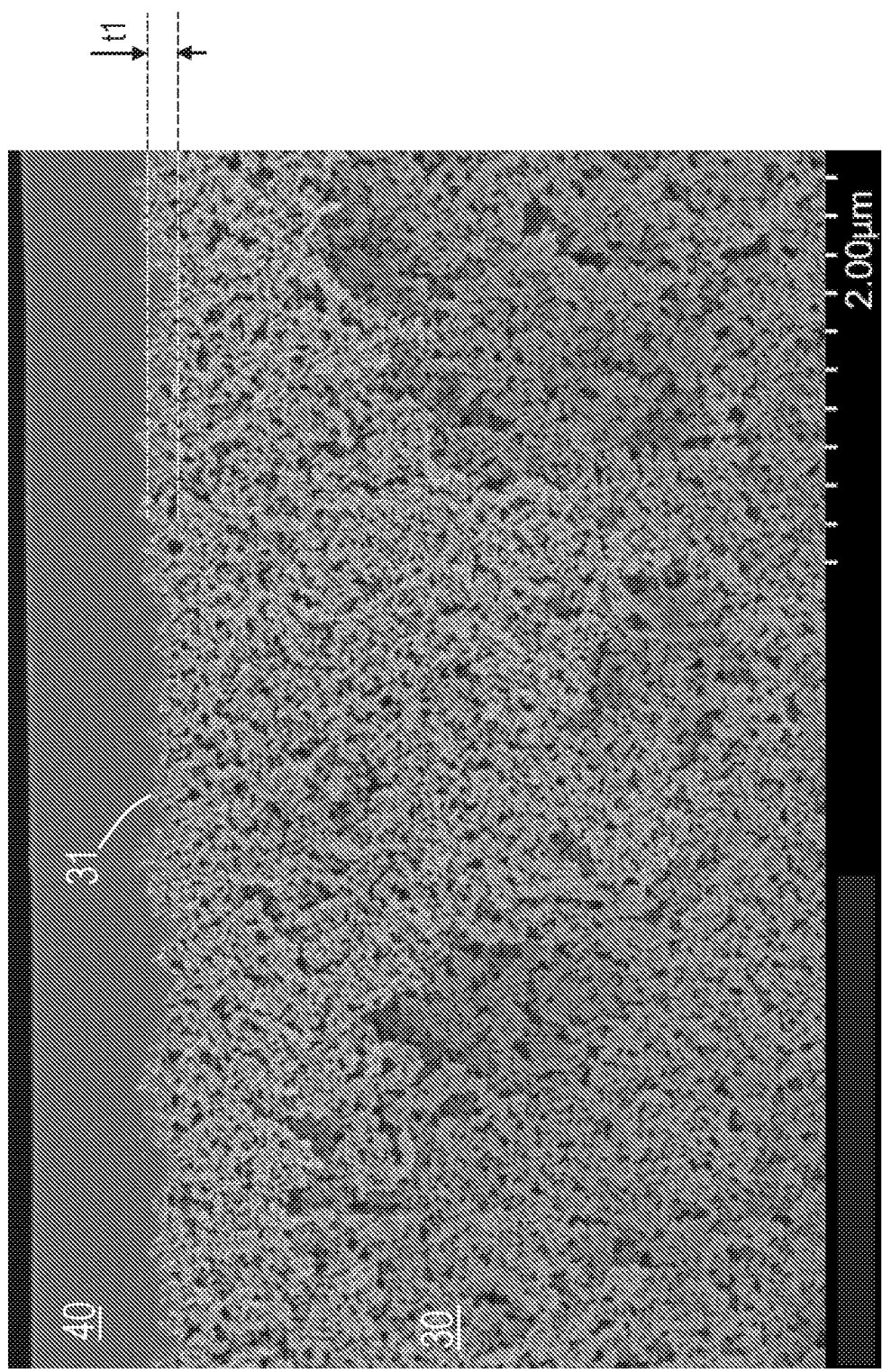
FIG. 5 is an exemplary SEM of a cross-section of the optical construction in FIG. 3.

FIGS. 3-4 show two exemplary scanning electron micrographs of the top surface of the optically diffusive layer (30) obtained using a scanning electron microscope (SEM) at two different magnifications. FIG. 5 shows an exemplary scanning electron micrograph of the cross-section of the optically diffusive layer (30)

In some aspects, as best shown in FIGS. 3 and 4, the optically diffusive layer (30) may include a plurality of particles (33) dispersed between and across the third (31) and fourth (32) major surfaces. The particles (33) can be any type particles that may be desirable in an application. For example, particles (33) can be organic or inorganic particles. For example, the particles (33) can be nanoparticles, including silica. Exemplary particles (33) may also include fumed metal oxides or pyrogenic metal oxides, such as, for example, a fumed silica or alumina. The particles (33) can have any shape that may be desirable or available in an application. For example, particles (33) can have a regular or irregular shape. For example, particles (33) can be approximately spherical. As another example, the particles (33) can be elongated.

The optically diffusive layer (30) may include a plurality of interconnected porous aggregates (35) where each aggregate (35) may include a plurality of particles (33), and a binder (34) that coats and interconnects the plurality of the particles (33). The aggregates (35) may have irregular shapes. The interconnected particles (33) in the aggregate (35) may define a plurality of voids (36) that may be dispersed between the plurality of particles (33).

The binder (34) can be or include any material that may be desirable in an application. For example, the binder (34) may include a polymeric material bonding the particles (33) to each other to form the plurality of particle aggregates (35) defining the plurality of voids (36) therebetween. The particles (33) are bound to the binder (34), where the bonding can be physical or chemical. Examples of useful binder resins are those derived from thermosetting, thermoplastic and UV curable polymers.

Examples include polyvinylalcohol, (PVA), polyvinylbutyral (PVB), polyvinyl pyrrolidone (PVP), polyethylene vinyl acetate copolymers (EVA), cellulose acetate butyrate (CAB) polyurethanes (PURs), polymethylmethacrylate (PMMA), polyethylene oxide, polypropylene oxide, polyacrylates, epoxies, silicones and fluoropolymers, or a combination thereof. In general, the binder (34) can be any polymerizable material, such as a polymerizable material that is radiation-curable. Although the binder can be a polymeric system, it can also be added as a polymerizable monomeric system, such as a UV, or thermally curable or crosslinkable system. Examples of such systems would be UV polymerizable acrylates, methacrylates, multi-functional acrylates, urethane-acrylates, and mixtures thereof.

In some cases, at least a majority of the particles (33), such as at least 60% or 70% or 80% or 90% or 95% of the particles (33), may have a size that is not greater than about 1 micrometer, or not greater than about 700, or 500, or 200, or 100, or 50 nanometers. In some cases, in a cross-section of the optically diffusive layer (30) in a plane (xz-plane) substantially orthogonal to the optically diffusive layer (30), the particles (33) may have an average size of between about 20 nm to about 150 nm. When the particles (33) are aggregated, the particle aggregates (35) may have an average size of between about 100 nm and about 1000 nm.

In general, the optically diffusive layer (30) with low refractive index, or ULI layers, can have any porosity, pore size distribution, or void volume fraction that may be desirable in an application. In some embodiments, the volume fraction of the plurality of the voids (36) in the optically diffusive layer (30) may be between about 15% and about 45% of an area of the optically diffusive layer (30). In some cases, the voids may occupy between about 25% to about 40% of an area of the optically diffusive layer.

Exemplary binder (34) to particle (33) ratios are less than 1:2 (less than 33% binder), less than 1:3, less than 1:4, less than 1:5, less than 1:6, less than 1:7, less than 1:8, less than 1:9, and less than 1:10 (about 8-10% binder). The upper limit of the binder (34) may be dictated by the desired refractive index of the optically diffusive layer (30). The lower limit of binder (34) may be dictated by the desired physical properties, for example, processing or final durability characteristics. Thus the binder to particle ratio will vary depending on the desired end use and the desired optical properties.

In some aspects, as shown in FIG. 1, a sealing layer (40) may be disposed on the outermost substantially planar third major surface (31) of the optically diffusing layer (30). The sealing layer (40) may be disposed on the optically diffusive layer (30) in order to protect the porous optically diffusive layer (30) from contaminants. The sealing layer (40) can have any useful thickness. For instance, the sealing layer (40) may have an average thickness of less than about 1.2 microns, or less than about 1.1 microns, or less than about 1 micron, or less than about 0.9 microns, or less than about 0.8 microns, or less than 0.75 microns. Low index optically diffusive layers with an adjacent sealing layer (40) that diffuses into the low index optically diffusive layer (30) can further have the benefit of strengthening the low index coating.

In some aspects, the sealing layer (40) may partially penetrate the outermost substantially planar third major surface (31) of the optically diffusing layer (30). As shown in FIG. 5, an average penetration depth (t1) of the sealing layer (40) into the outermost substantially planar third major surface (31) of the optically diffusing layer (30) may be less than about 0.5 microns, or less than about 0.4 microns, or less than about 0.3 microns, or less than about 0.2 microns. In some aspects, the sealing layer (40) may include polyvinylalcohol (PVA), or other diffusing polymers having high enough molecular weight to not penetrate beyond a desirable thickness into the outermost substantially planar third major surface (31) of the optically diffusive layer (30).

The invention claimed is:

1. An integral optical stack comprising:
   a lens film comprising an outermost structured first major surface and an opposing outermost second major surface, the structured first major surface comprising a two-dimensional array of microlenses having an average peak-to-valley height PV1;
   a light absorbing layer disposed on the second major surface side of the lens film and defining a plurality of through physical openings therein extending between opposite outermost major surfaces of the light absorbing layer, the through physical openings aligned to the microlenses in a one-to-one correspondence; and
   a substantially planarizing optically diffusive layer disposed on the structured first major surface of the lens film and comprising an outermost substantially planar third major surface facing away from the first major surface of the lens film and an opposite outermost structured fourth major surface facing and substantially conforming to the microlenses in the array of microlenses of the structured first major surface, the optically diffusive layer comprising:
   a plurality of nanoparticles dispersed between and across the third and fourth major surfaces, the nanoparticles comprising silica;
   a polymeric material bonding the nanoparticles to each other to form a plurality of nanoparticle aggregates defining a plurality of voids therebetween, such that in a cross-section of the optically diffusive layer in a plane substantially orthogonal to the optically diffusive layer, the nanoparticles have an average size of between about 20 nm to about 150 nm, the nanoparticle aggregates have an average size of between about 100 nm and about 1000 nm, and the voids occupy between about 15% to about 45% of an area of the optically diffusive layer;
   an average thickness of greater than about 8 microns; and
   an index of refraction of less than about 1.25 for at least one visible wavelength in a range from about 420 nm to about 680 nm; wherein
   any non-planarity of the substantially planar third major surface due to the microlenses in the array of microlenses of the structured first major surface has an average peak-to-valley height PV2, PV2≤0.7 PV1;
   wherein the optical stack has an integral construction.

2. The integral optical stack of claim 1 further comprising a sealing layer disposed on, and partially penetrating, the outermost substantially planar third major surface of the optically diffusing layer, the sealing layer having an average thickness of less than about 1.2 microns.

3. The integral optical stack of claim 2, wherein an average penetration depth of the sealing layer into the outermost substantially planar third major surface of the optically diffusing layer is less than about 0.5 microns.

4. The integral optical stack of claim 1, wherein PV1 is greater than about 1.5 microns.

5. The integral optical stack of claim 1, wherein PV2 is less than about 1 micron.

6. A detection system for detecting a user body portion applied to the detection system, the detection system comprising a light source, and the integral optical stack of claim 1 disposed on an optical detector, the light source configured to emit a first light toward the user body portion applied to the detection system, the optical detector configured to detect at least a portion of the first light after it is reflected by the user body portion and passes through at least some of the through physical openings.

7. The detection system of claim 6 comprising a display system comprising a display panel disposed on the substantially planar third major surface of the optically diffusive layer opposite the light absorbing layer, the display panel configured to display an image for viewing by a user.

8. The detection system of claim 7 further comprising a bonding layer bonding the display panel to the substantially planar third major surface of the optically diffusive layer, the bonding layer being devoid of air bubbles configured to substantially scatter visible light.

* * * * *